United States Patent
Park et al.

(10) Patent No.: US 7,360,480 B2
(45) Date of Patent: Apr. 22, 2008

(54) BREAD MAKER

(75) Inventors: Jae-ryong Park, Suwon (KR); Yong-hyun Kwon, Suwon (KR); Chul Kim, Anyang (KR); Tae-uk Lee, Suwon (KR); Han-jun Sung, Suwon (KR); Jang-woo Lee, Suwon (KR); Dong-bin Lim, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 369 days.

(21) Appl. No.: 10/805,352

(22) Filed: Mar. 22, 2004

(65) Prior Publication Data

US 2004/0221737 A1 Nov. 11, 2004

(30) Foreign Application Priority Data

May 7, 2003 (KR) ...................... 10-2003-0029127

(51) Int. Cl.
*A47J 37/01* (2006.01)
*A21B 1/00* (2006.01)

(52) U.S. Cl. ............................ 99/348; 99/447; 99/467; 126/275 E

(58) Field of Classification Search ................. 99/348, 99/467, 401, 447; 219/401; 126/275 R, 126/273 R, 275 E
See application file for complete search history.

(56) References Cited

U.S. PATENT DOCUMENTS

| 4,294,166 A | * | 10/1981 | Takeuchi | ..................... 99/348 |
|---|---|---|---|---|
| 4,455,319 A | * | 6/1984 | Clark | ......................... 426/233 |
| 5,076,153 A | * | 12/1991 | Takahashi et al. | ............. 99/327 |
| 5,191,831 A | * | 3/1993 | Walden | ....................... 99/446 |
| 5,415,081 A | * | 5/1995 | Yoshida et al. | ............... 99/326 |
| 5,747,781 A | * | 5/1998 | Kim et al. | ................... 219/685 |
| 5,778,766 A | * | 7/1998 | Wang | ........................... 99/326 |
| 5,818,014 A | * | 10/1998 | Smith et al. | ................. 219/679 |
| 5,839,356 A | * | 11/1998 | Dornbush et al. | ............. 99/331 |
| 5,947,009 A | | 9/1999 | Hedenberg | |

(Continued)

FOREIGN PATENT DOCUMENTS

CN 1248420 3/2000

(Continued)

OTHER PUBLICATIONS

U.S. Appl. No. 10/738,206, filed Dec. 18, 2003, Han-jun Sung et al.

*Primary Examiner*—Reginald L. Alexander
(74) *Attorney, Agent, or Firm*—Staas & Halsey LLP

(57) ABSTRACT

A bread maker comprising: a main body; an oven having a surface coated with a ceramic material, and being accommodated in the main body; a door provided in a front of the main body to open and close the oven; and upper heaters and lower heaters respectively disposed in upper and lower parts of the oven and the door. The oven is coated with a ceramic material so that an inner surface of the oven does not become deformed due to a high temperatures, and so that an inner surface of the oven that is stained or coated with bread ingredients can be easily cleaned. The upper heaters are inclined downward, thereby enhancing heating efficiency. Further, the oven components are detachable so that a damaged part of the oven can be separately replaced.

9 Claims, 5 Drawing Sheets

U.S. PATENT DOCUMENTS 6,323,472 B1 * 11/2001 Coleman ................ 219/685

FOREIGN PATENT DOCUMENTS

| | | |
|---|---|---|
| EP | 1 382 280 A1 | 1/2004 |
| JP | 7-8387 | 1/1995 |
| JP | 9-133366 | 5/1997 |
| JP | 2001-245580 | 9/2001 |
| JP | 2001-523444 | 11/2001 |
| KR | 20-214932 | 12/2000 |
| KR | 2001-32188 | 4/2001 |
| KR | 20-231762 | 5/2001 |
| WO | WO 99/25467 | 5/1999 |

* cited by examiner

BREAD MAKER

CROSS-REFERENCE TO RELATED APPLICATIONS

This application claims the benefit of Korean Patent Application No. 2003-29127, filed May 7, 2003, in the Korean Intellectual Property Office, the disclosure of which is incorporated herein by reference.

BACKGROUND OF THE INVENTION

1. Field of the Invention

The present invention relates to a bread maker, and, more particularly, to a bread maker that can resist high temperatures and enhance heating efficiency.

2. Description of the Related Art

Bread is food made from flour or meal mixed with yeast, water, salt, etc. The bread maker ingredients are kneaded, leavened, and baked. However, the process of making bread can be complicated and difficult for the average person to personally make bread at home.

Therefore, there has been developed a bread maker that allows a user to easily and conveniently make bread, which automatically performs a chain of processes, such as kneading, leavening, and baking.

Generally, a conventional bread maker includes a main body having an oven compartment, an oven accommodated in the oven compartment, a baking tray provided inside the oven, a door provided in the front of the main body to open and close the oven compartment, and a plurality of heaters to heat the inside of the oven.

However, in the conventional bread maker, an inner surface of the oven may become deformed and stained by the bread ingredients after baking because of the high temperature required to bake the bread. It is not easy to remove the hardened ingredients adhered to the inner surface of the oven.

Further, in the conventional bread maker, the heaters are horizontally positioned in upper and lower parts of both the door and the oven, respectively. The horizontal position of the upper heaters affects the efficiency of heating the baking tray because the upper heaters are relatively distant from the baking tray as compared to the lower heaters.

SUMMARY OF THE INVENTION

It is an aspect of the present invention to provide a bread maker that can resist high temperatures and enhance heating efficiency.

Additional aspects and/or advantages of the invention will be set forth in part in the description that follows and, in part, will be obvious from the description, or may be learned by practice of the invention.

To achieve the above and/or other aspects of the present invention, there is provided a bread maker including a main body; an oven having a surface coated with a ceramic material, and being accommodated in the main body; a door provided in a front of the main body to open and close the oven; and upper heaters and lower heaters respectively disposed in upper and lower parts of the oven and the door.

The oven includes a rear part placed inside the main body at a rear of the main body; and side parts detachably connected to the rear part and placed at left and right sides inside the main body, respectively.

The upper heaters are sloped downward.

To achieve the above and/or other aspects according to the present invention, there is provided an oven for a bread maker having a main body, the oven comprising: a rear part detachably placed inside the main body at a rear of the main body; side parts detachably connected to opposite sides of the rear part, respectively; an upper heater and a lower heater respectively disposed at an upper part and a lower part of the oven; and a ceramic material coating a surface of the oven to provide heat resistance.

These, together with other aspects and/or advantages that will be subsequently apparent, reside in the details of construction and operation as more fully hereinafter described and claimed, reference being had to the accompanying drawings forming a part thereof, wherein like numerals refer to like parts throughout.

BRIEF DESCRIPTION OF THE DRAWINGS

These and/or other aspects and advantages of the invention will become apparent and more readily appreciated from the following description of the preferred embodiments, taken in conjunction with the accompanying drawings, of which.

DETAILED DESCRIPTION OF THE PREFERRED EMBODIMENT

Figure 1:
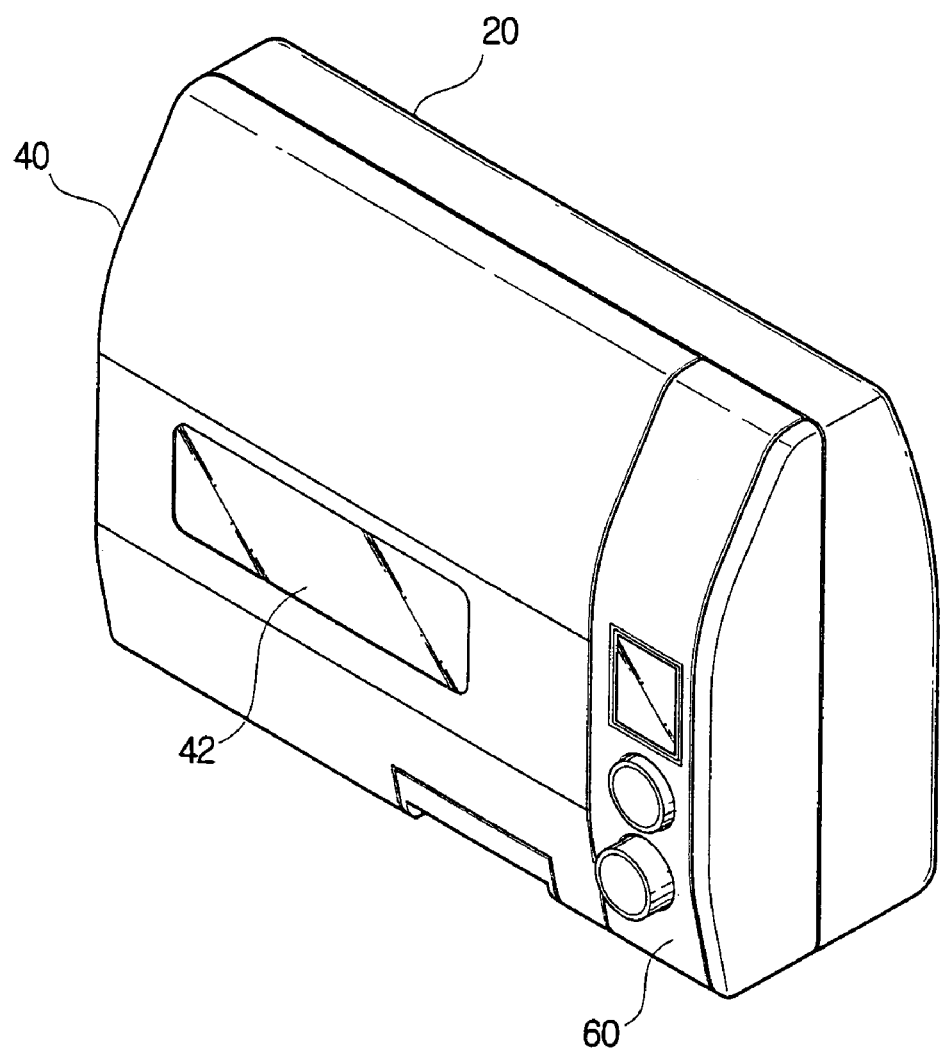
FIG. 1 is a perspective view of a bread maker according to an embodiment of the present invention.

Hereinafter, an embodiment of the present invention will be described in detail with reference to the attached drawings, wherein the like reference numerals refer to the like elements throughout. The present invention may, however, be embodied in many different forms and should not be construed as being limited to the embodiment set forth herein. Rather, this embodiment is provided so that the present disclosure will be thorough and complete, and will fully convey the concept of the invention to those skilled in the art.

Figure 2:
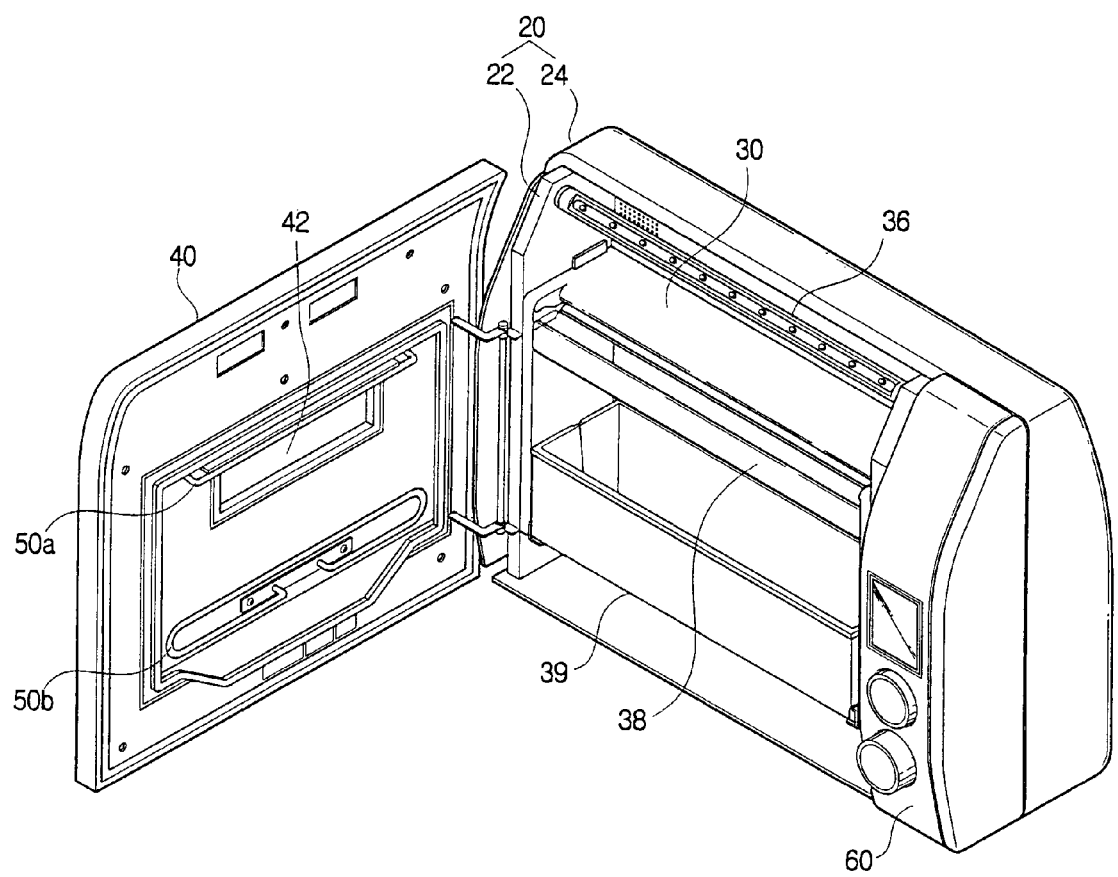
FIG. 2 is a perspective view of the bread maker of FIG. 1, with a door opened.
Figure 3:
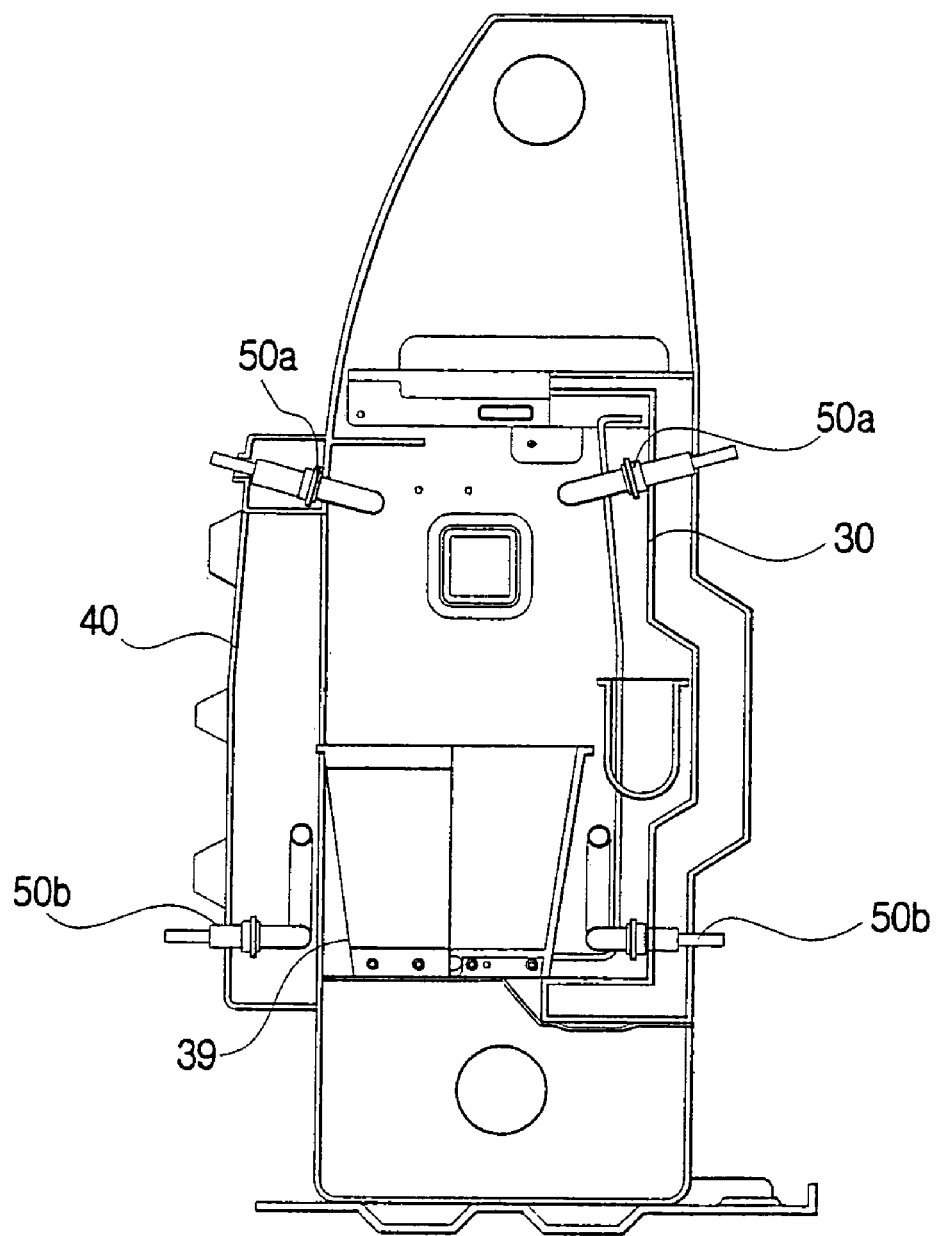
FIG. 3 is a sectional view illustrating an internal structure of the bread maker of FIG. 2.

As shown in FIGS. 1 through 3, a bread maker according to an embodiment of the present invention includes a main body 20, an oven 30 having a surface coated with a ceramic material and being accommodated in the main body 20, a door 40 provided in the front of the main body 20 to open and close the oven 30, and upper heaters 50a and lower heaters 50b having a heating pipe structure and being respectively disposed in upper and lower parts of the inside of the oven 30 and the door 40.

The main body 20 includes a frame 22 forming an oven compartment in which the oven 30 is accommodated, a frame cover 24 covering the outside of the frame 22, and a control panel 60 provided in a front side of the main body 20 to allow a user to control the bread maker and to view an operating state of the bread maker.

The oven 30 is coated with the ceramic material to enhance heat-resistant properties, and to allow an inner surface of the oven 30 that is stained or coated with ingredients for bread to be easily cleaned. The oven 30 is glazed with the ceramic material and then baked.

In upper and lower sides of the inside of the oven 30 are provided an upper kneading drum 36 and a lower kneading drum (not shown), which are disposed in parallel and alternate between clockwise and counterclockwise rotations. On the upper kneading drum 36 and the lower kneading drum are respectively wound opposite ends of a mixing bag (not shown) filled with the ingredients for the bread. Between the upper kneading drum 36 and the lower kneading drum is provided a pair of dough-blocking members 38 to prevent dough that is being kneaded in the mixing bag from moving toward the upper kneading drum 36. Further, inside the oven 30 is a baking tray 39 shaped like a box with a top opening to contain the completely kneaded dough. The baking tray 39 is made of, for example, aluminum or steel, which both have good heat-resistant properties.

The door 40 is rotatably connected to the main body 20 to selectively open and close a front opening of the oven 30.

The upper heaters 50a and lower heaters 50b are respectively disposed in the upper and lower parts of the inside of the door 40 and the oven 30 to heat the inside of the oven 30. The upper heaters 50a, which are relatively distant from the baking tray 39 as compared to the lower heaters 50b, are sloped downward, thereby enhancing heating efficiency.

Further, the door 40 comprises a glass window 42 allowing a user to view the inside of the oven 30 therethrough.

Figure 4:
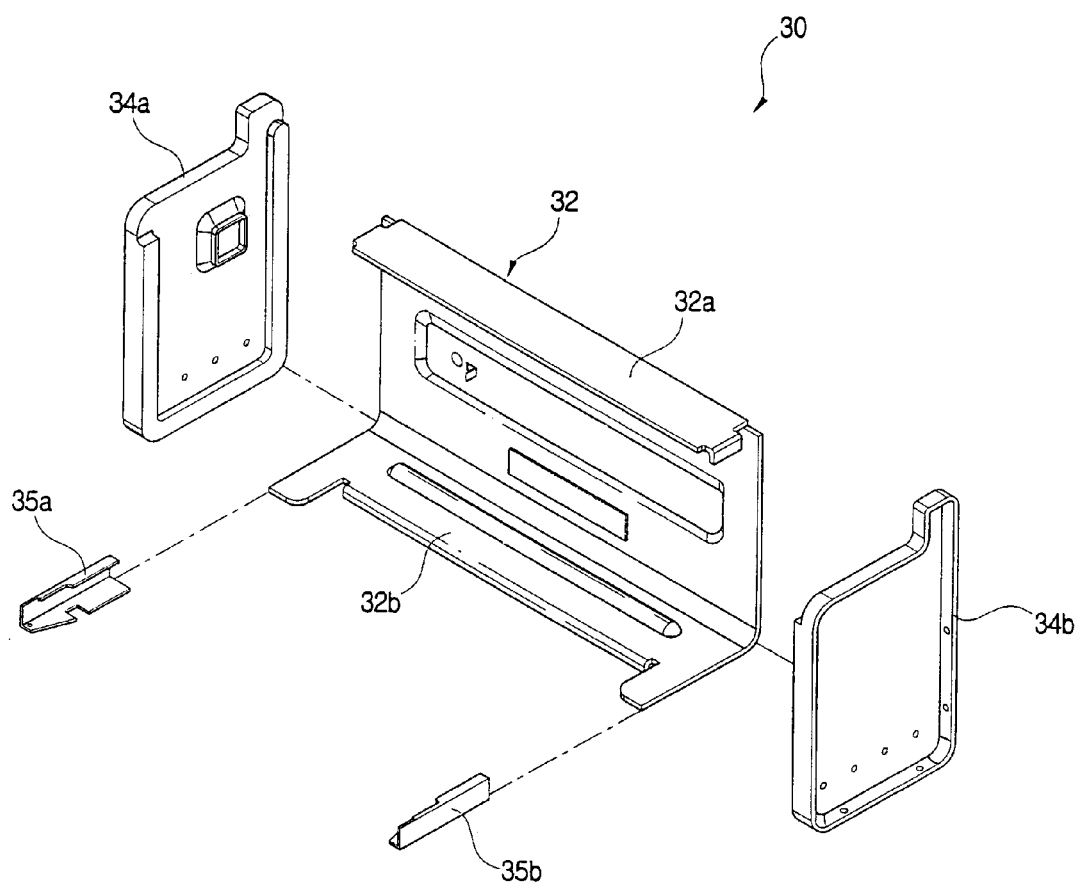
FIG. 4 is an exploded perspective view illustrating an oven of the bread maker of FIG. 3.
Figure 5:
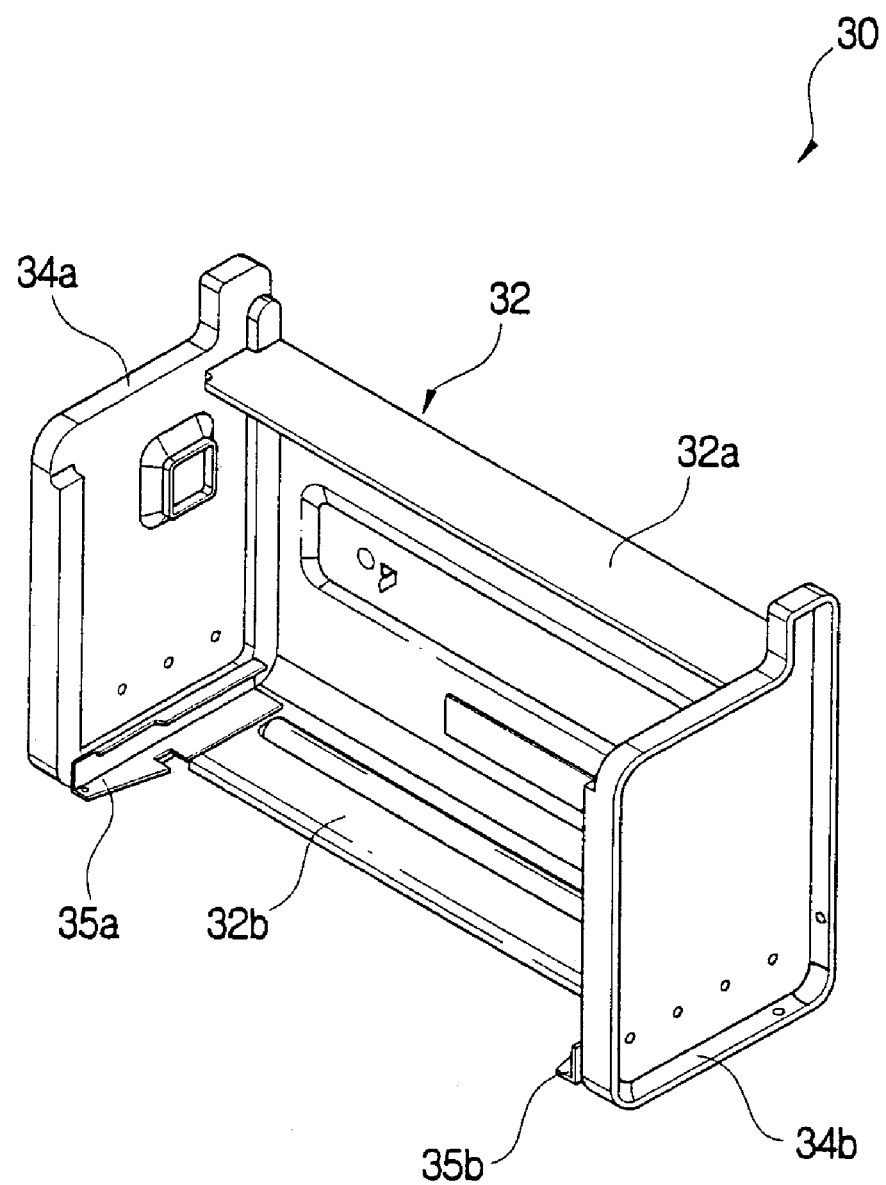
FIG. 5 is a perspective view of the oven of FIG. 4.

As shown in FIGS. 4 and 5, the oven 30 comprises a rear part 32 placed inside the main body 20 at a rear of the main body 20, and side parts 34a and 34b detachably connected to the rear part 32 and placed in left and right sides of the inside of the main body 20, respectively.

The rear part 32 and the side parts 34a and 34b are detachable from the oven 30. The oven 30 further includes an upper bending part 32a and a lower bending part 32b that are respectively disposed in upper and lower parts of the rear part 32, and to which components such as baking tray rails 35a and 35b, etc., are connected.

The baking tray rails 35a and 35b are respectively connected to opposite sides of the lower bending part 32b, and support the baking tray 39.

Further, the oven 30 is formed with a plurality of assembling holes to which various components are combined.

As described above, the present invention provides a bread maker in which an oven is coated with a ceramic material to prevent an inner surface of the oven from becoming deformed due to high temperatures, and to allow an inner surface of the oven 30 stained or coated with ingredients for bread to be easily cleaned.

Also, the present invention provides a bread maker in which upper heaters are sloped downward, thereby enhancing heating efficiency.

Further, the present invention provides a bread maker in which an oven has a detachable structure, so that only a damaged part of the oven need be replaced.

Although an embodiment of the present invention has been shown and described, it will be appreciated by those skilled in the art that changes may be made in this embodiment without departing from the principles and spirit of the invention, the scope of which is defined in the appended claims and their equivalents.

What is claimed is:

1. A bread maker comprising:
   a main body;
   an oven having a surface coated with a ceramic material, and being accommodated in the main body;
   a door provided in a front of the main body to open and close the oven; and
   an upper heater and a lower heater respectively disposed in upper and lower parts of the oven and the door,
   wherein the upper heater and lower heater are fixed in upper and lower parts of the oven and the door,
   wherein the upper heater is sloped downward towards a center of the oven,
   wherein the oven comprises:
   a rear part placed inside the main body at a rear of the main body, and
   side parts detachably connected to the rear part and placed at left and right sides inside the main body, respectively.

2. The bread maker according to claim 1, wherein the oven comprises an upper bending part attached to the upper part of the rear part and a lower bending part attached to the lower part of the rear part.

3. The bread maker according to claim 2, further comprising:
   a baking tray to hold and bake bread dough; and
   baking tray rails respectively connected to opposite sides of the lower bending part to support the baking tray.

4. The bread maker according to claim 1, wherein a distance between the upper heater and the center of the oven decreases in a downward direction of the upper heater.

5. An oven for a bread maker having a main body, the oven comprising:
   a door provided in a front of the main body to open and close the oven;
   a rear part detachably placed inside the main body at a rear of the main body;
   side parts detachably connected to opposite sides of the rear part, respectively;
   an upper heater and a lower heater respectively disposed at an upper part and a lower part of the oven,
   wherein the upper heater and lower heater are fixed in upper and lower parts of the oven and the door; and
   a ceramic material coating a surface of the oven to provide heat resistance,
   wherein the upper heater is sloped downward to enhance heating efficiency.

6. The oven of claim 5, wherein the ceramic material allows the surface of the oven to be easily cleaned.

7. The oven of claim 5, wherein the ceramic material prevents the surface of the oven from becoming deformed due to high temperatures.

8. The oven of claim 5, wherein the rear part and the side parts are detached from the oven to allow individual replacement.

9. An oven for a bread maker having a main body, the oven comprising:
   a door provided in a front of the main body to open and close the oven;
   a rear part detachably placed inside the main body at a rear of the main body;
   side parts detachably connected to opposite sides of the rear part, respectively; and
   an upper heater and a lower heater respectively disposed at an upper part and a lower part of the oven, the upper heater being sloped downward towards a center of the oven to enhance heating efficiency,
   wherein the upper heater and lower heater are fixed in upper and lower parts of the oven and the door.

* * * * *